United States Patent
Issakov et al.

(10) Patent No.: US 9,060,281 B2
(45) Date of Patent: Jun. 16, 2015

(54) OVERLAY NETWORK-BASED LOCATION OF E-UTRAN DEVICES

(71) Applicant: TruePosition, Inc., Berwyn, PA (US)

(72) Inventors: Simon Issakov, Wayne, PA (US); Rashidus S. Mia, Phoenixville, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 289 days.

(21) Appl. No.: 13/621,947

(22) Filed: Sep. 18, 2012

(65) Prior Publication Data
US 2014/0080503 A1 Mar. 20, 2014

(51) Int. Cl.
H04Q 7/00 (2006.01)
H04W 24/00 (2009.01)
G01S 5/00 (2006.01)
H04W 64/00 (2009.01)
H04W 76/02 (2009.01)

(52) U.S. Cl.
CPC ............. *H04W 24/00* (2013.01); *G01S 5/00* (2013.01); *H04W 64/00* (2013.01); *H04W 76/02* (2013.01)

(58) Field of Classification Search
USPC ......... 455/456, 456.1, 456.2, 456.5; 370/252, 370/230, 310
See application file for complete search history.

(56) References Cited

U.S. PATENT DOCUMENTS

| | | | |
|---|---|---|---|
| 4,728,959 A | 3/1988 | Maloney et al. | |
| 5,327,144 A | 7/1994 | Stilp et al. | |
| 5,608,410 A | 3/1997 | Stilp et al. | |
| 6,047,192 A | 4/2000 | Maloney et al. | |
| 6,782,264 B2 | 8/2004 | Anderson | |
| 6,996,392 B2 | 2/2006 | Anderson et al. | |
| 7,167,713 B2 | 1/2007 | Anderson | |
| 7,616,155 B2 | 11/2009 | Bull et al. | |
| 7,783,299 B2 | 8/2010 | Anderson et al. | |
| 8,150,421 B2 | 4/2012 | Ward et al. | |
| 8,213,957 B2 | 7/2012 | Bull et al. | |
| 8,224,348 B2 | 7/2012 | Bolon et al. | |
| 8,427,971 B2 * | 4/2013 | Fischer et al. ............... | 370/252 |
| 2002/0082032 A1 * | 6/2002 | Hunzinger .................. | 455/510 |
| 2003/0225887 A1 | 12/2003 | Purnadi et al. | |
| 2004/0203429 A1 * | 10/2004 | Anderson et al. ......... | 455/67.11 |

(Continued)

FOREIGN PATENT DOCUMENTS

EP 2306782 A1 4/2011

OTHER PUBLICATIONS

3rd Generation Partnership Project (3GPP), TS 36.300, 3rd Generation Partnership Project; Evolved Universal Terrestrial Radio Access (E-UTRA) and Evolved Universal Terrestrial Radio Access Network (E-UTRAN) Overall Description; Stage 2, Section 10.1.5, Jul. 2010, 178 pages.
3rd Generation Partnership Project (3GPP), TS 36.211, "3rd Generation Partnership Project; Evolved Universal Terrestrial Radio Access (E-UTRA), Physical channels and modulation", Section 5.7, Version 8.7.0, Jun. 2009, 15 pages.
3rd Generation Partnership Project (3GPP), TS 36.213, 3rd Generation Partnership Project; Evolved Universal Terrestrial Radio Access (E-UTRA) Physical layer procedures, Section 6, Version, 8.8.0, Release 8, Oct. 2009, 7 pages.

(Continued)

*Primary Examiner* — Ajit Patel
*Assistant Examiner* — Julio Perez
(74) *Attorney, Agent, or Firm* — Baker & Hostetler LLP

(57) ABSTRACT

In an overlay, network-based, wireless location system, passive network probes and Location Measurement Units, typically co-located with eNodeB's, are used to collect identity information and radio signaling both in the forward and reverse channels for use in power-based, timing-based and/or angle-based positioning methods in Long Term Evolution (LTE) and LTE-Advanced wireless communications networks.

27 Claims, 4 Drawing Sheets

(56) References Cited

U.S. PATENT DOCUMENTS

| | | | |
|---|---|---|---|
| 2008/0167042 A1* | 7/2008 | Kitazoe | 455/436 |
| 2009/0143018 A1 | 6/2009 | Anderson et al. | |
| 2009/0170528 A1 | 7/2009 | Bull et al. | |
| 2010/0098023 A1 | 4/2010 | Aghili et al. | |
| 2010/0296451 A1 | 11/2010 | Li et al. | |
| 2011/0159891 A1 | 6/2011 | Segall et al. | |
| 2012/0020320 A1 | 1/2012 | Issakov et al. | |
| 2012/0033613 A1 | 2/2012 | Lin et al. | |
| 2012/0155324 A1 | 6/2012 | Janakiraman et al. | |
| 2012/0208561 A1 | 8/2012 | Zhang et al. | |
| 2014/0036847 A1* | 2/2014 | Jeong et al. | 370/329 |
| 2014/0233528 A1* | 8/2014 | Webb et al. | 370/330 |

OTHER PUBLICATIONS

3rd Generation Partnership Project (3GPP), TS 36.101, "3rd Generation Partnership Project; Evolved Universal Terrestrial Radio Access (E-UTRA) User Equipment (UE) radio transmission and reception", Sections 5.5-1 "E-UTRA Operating Bands" and 5.6.1-1 "E-UTRA Channel Bandwith" Version 10.3.0, Release 10, Jun. 2011, 10 pages.

3rd Generation Partnership Project (3GPP), TS 36.331, 3rd Generation Partnership Project; Evolved Universal Terrestrial Radio Access (E-UTRA) Radio Resource Control (RRC); Protocol specification, Section 6.2.2, Release 10, Version 10.5.0, Mar. 2012, 45 pages.

* cited by examiner

OVERLAY NETWORK-BASED LOCATION OF E-UTRAN DEVICES

TECHNICAL FIELD

The present invention relates generally to methods and apparatus for locating wireless devices, also called mobile stations (MS), such as those used in digital cellular systems, personal communications systems (PCS), enhanced specialized mobile radios (ESMRs), and other types of wireless communications systems. Still more particularly, the present invention relates to methods and apparatus for enabling network-based location in an LTE or LTE-A radio access network. In these networks, the wireless device or MS is called the User Equipment, or UE.

BACKGROUND

Early work relating to network-based Wireless Location Systems is described in U.S. Pat. No. 4,728,959; "Direction Finding Localization System" (issued Mar. 1, 1998) which discloses a system for locating cellular telephones using angle of arrival (AOA) techniques and U.S. Pat. No. 5,327,144, (Issued Jul. 5, 1994) "Cellular Telephone Location System," which discloses a system for locating cellular telephones using time difference of arrival (TDOA) techniques. Further enhancements of the system disclosed in the '144 patent are disclosed in U.S. Pat. No. 5,608,410, (Issued Mar. 4, 1997), "System for Locating a Source of Bursty Transmissions". Location estimation techniques for wide-band wireless communications systems were further developed in U.S. Pat. No. 6,047,192 (Issued Apr. 4, 200), "Robust, Efficient Localization System".

With the rapid rate of cellular radio development and shortening development cycles (since 1978, the industry has produced AMPS, TDMA, CDMA, UMTS, CDMA-2000, WiMAX, LTE and LTE-Advanced), a minimally invasive, overlay wireless location network that does not require extensive integration and testing in a multi-vendor network has met with great success. In the course of its history of developing and deploying Time Difference of Arrival (TDOA), Angle Of Arrival (AOA) and hybrid wireless location systems, the assignee of the present invention, TruePosition, Inc., has developed a portfolio of techniques around overlay and minimally invasive wireless location systems. TruePosition's portfolio of United States patents include:

U.S. Pat. No. 6,782,264; Monitoring of Call Information in a Wireless Location System;
U.S. Pat. No. 6,996,392; E-911 Overlay solution for GSM, for use in a Wireless Location System;
U.S. Pat. No. 7,167,713; Monitoring of call information in a wireless location system
U.S. Pat. No. 7,616,155; Portable, iterative geolocation of RF emitters;
U.S. Pat. No. 7,783,299; Advanced triggers for location-based service applications in a wireless location system;
U.S. Pat. No. 8,213,957; Network autonomous wireless location system;
U.S. Pat. No. 8,224,348; Location intelligence management system.

TruePosition has continued to develop significant enhancements to the original inventive concepts. First commercially deployed in 1998 by TruePosition in Houston Tex., overlay network-based wireless location systems have been widely deployed in support of location-based services including emergency services location. As realized and noted in extensive prior art, the ability to routinely, reliably, and rapidly locate cellular wireless communications devices has the potential to provide significant public benefit in public safety and convenience and in commercial productivity.

The Long-Term Evolution (LTE and LTE-Advanced) successors to the Universal Mobile Telephone System (UMTS) are based on the orthogonal frequency-division multiplexing (OFDM) scheme. LTE was initially introduced in Release 8 of $3^{rd}$ Generation Program Partnership specification with Release 9 adding minor enhancements and UE positioning including Assisted Global Navigation Satellite System (A-GNSS (the current working example is the United States' NavStar Global Positioning System)), Enhanced Cell-ID (ECID or E-CID), and Observed Time Difference of Arrival (OTDOA) techniques. In Release 10, LTE-Advanced (LTE-A) was introduced and work on both LTE and LTE-A continues in 3GPP Release 11.

The LTE network (also called an evolved Universal Mobile Telephony Radio Access Network (eUTRAN) or Evolved Universal Terrestrial Radio Access (E-UTRA)) can be used in both paired spectrum for Frequency Division Duplex (FDD) mode and unpaired spectrum for Time Division Duplex (TDD) mode allowing coexistence in the same network. The LTE system, designed to support packet-based communications, relies on dynamic scheduling of physical resources (in both the frequency and time domains) in order to achieve high user data rates. Both the downlink (eNodeB-to-UE) and, via grants, uplink (UE-to-eNodeB) radio resources are under the control of the eNodeB (eNB).

The LTE specification (primarily the $3^{rd}$ Generation Partnership Program (3GPP) Technical Specification 36.305, "Evolved Universal Terrestrial Radio Access Network (E-UTRAN); Stage 2 functional specification of User Equipment (UE) positioning in E-UTRAN)) describes several location techniques for LTE wireless devices. The standardized location functionality provides a means to determine the geographic position and/or velocity of the User Equipment based on measuring radio signals. Hybrid positioning using multiple methods from the standardized positioning methods is also supported in the LTE technical standards. A goal of the present invention is to provide methods and systems to enable the use of network-based techniques (U-TDOA, AOA, POA, etc.) for locating mobile devices using the uplink SC-FDMA (Single-Carrier Frequency Division Multiple Access) radio signal used in both LTE and LTE-A.

SUMMARY

In one illustrative embodiment, the present invention provides a new system combining both passive radio network monitors and passive wired monitors. These monitors are employed to obtain both the triggering information and mobile identity used for wireless location.

Obtaining uplink TDOA measurements in an LTE or LTE-A network is a significant challenge compared to other radio air interfaces (GSM, CDMA, CDMA-2000 or UMTS). In an LTE or LTE Advanced wireless communications system, the User Equipment (UE) uses a random access technique over the radio interface to initiate communications or respond to a communications request from the wireless communication network on a set group of dedicated channels. An overlay Location Measurement Unit (LMU) can detect and cache the initial Random Access Preamble message using the radio uplink monitor. The LMU can then use the downlink radio monitor to receive the Random Access Response message allowing the LMU to use the uplink monitor to be tuned to the correct PUSCH channel to receive the Radio Resource Control Connection Request. (As explained below, the PUSCH channel is part of the Physical Uplink Shared Channel/Uplink Shared Channel ((PUSCH/UL-SCH) structure for EUTRAN physical channels. The PUSCH carries uplink transport data together with control information.) From the Radio Resource Control (RCC) Connection Request, the LMU can determine the UE identity and reason code for the access. Dependent on the UE identity and/or the reason code, the Wireless Location System (WLS) can then task the LMU network to perform a location estimate using the cached uplink Random Access Preamble message. Using the collection time and acquired temporary Mobile Identifiers, the WLS can extract permanent mobile identification from the WCN passive probe network.

In one illustrative implementation of the invention, a method is provided for locating a wireless device operating in an LTE wireless communications system. In the illustrative implementation, a first wireless device (i.e., the device to be located) initially requests access to the LTE wireless communications system by employing a Random Access Channel (RACH) and a standardized process in which the first wireless device transmits a RACH preamble signal representing one of a predetermined total number of RACH preambles available in the LTE wireless communications system. The illustrative implementation further comprises, first, employing a plurality of location measuring units (LMU) to monitor an LTE uplink channel for uplink RACH transmissions. In this step, each of the plurality of LMUs is configured to operate as a reference LMU or a cooperative LMU. Then, upon detection of a RACH preamble matching one of the predetermined total number of RACH preambles, a preamble identifier (RA-RNTI) associated with the RACH preamble is recorded in a database, and a reference LMU is employed to monitor a downlink channel of the LTE communications system for a RACH Response signal (RAR) addressed to the first wireless device. The RAR is addressed to the first wireless device via a first temporary identifier (C-RNTI) assigned to the first wireless device. Next, the reference LMU is employed to detect a connection request message (RCC Connection Request) transmitted by the first wireless device. The connection request message includes a second temporary identifier and a reason code (Establishment Cause). The second temporary identifier is a SAE Temporary Mobile Subscriber Identity (S-TMSI) previously assigned to the first wireless device. The first temporary identifier (C-RNTI), second temporary identifier (S-TMSI), and reason code (Establishment Cause) are then associated in the database such that the database provides an access record including the preamble identifier (RA-RNTI), first and second temporary identifiers (C-RNTI, S-TMSI), and reason code (Establishment Cause). Finally, upon determining that the reason code matches a predefined trigger, the first wireless device is located.

Other aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
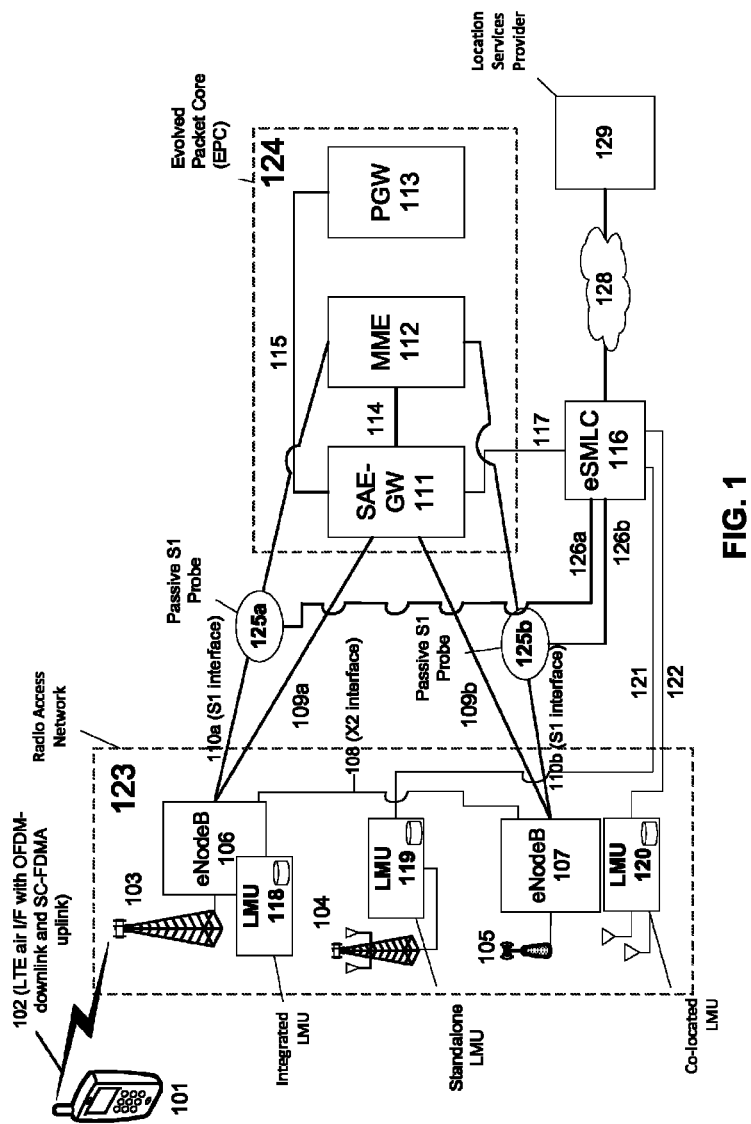
FIG. 1 schematically depicts an example eUTRAN/LTE wireless communications network with deployment options for a network-based wireless location system.

We will now describe illustrative embodiments of the present invention. First, we provide a detailed overview of the problem and then a more detailed description of our solutions.

The Long-Term-Evaluation (LTE) air-interface and network architecture is quite different from 1st generation analog voice cellular (AMPS), 2nd generation digital (IS-136 (aka TDMA), IS-95 (aka CDMA), and Global System for Mobility (GSM)), third generation Wide-Band CDMA digital cellular (IS-200 and Universal Mobile Telephone System (UMTS)), and possesses quite significant and unique challenges for supporting network-based wireless location systems such as Uplink-Time-Difference-of-Arrival (UTDOA), Angle of Arrival (AoA) and power-based techniques such as Enhanced Cell-ID (ECID), RF Fingerprinting, Signal-Strength-Measurement ranging and Power-Difference-of-Arrival. The LTE OFDM-based radio system is approaching the theoretical limits of achievable data rates over the radio air interface, so network vendors are optimizing performance by adding additional layers of RAN equipment (e.g., Remote Radio Units (RRUs), small Pico-cells, Relays Nodes, smaller Femto-cells, and WiFi (IEEE 802.11) offloading). Packet-based LTE, unlike other air-interfaces, is best positioned to support higher levels of application adaptive requirements.

The optimizations are done very dynamically, over different bands and air-interfaces. One of the major new trends is Multi-Radio Access Technology (multi-RAT) Basestations (BTS in GSM, NodeB in UMTS, eNodeB in LTE). A multi-RAT eNodeB, supporting GSM, UMTS, LTE or subset of these, allows operators to balance the load between RATs and select the optimal RAT for the current service (e.g., voice or packet data). As wireless communications networks will include different layers of communication protocols and application requirements, to meet positioning QoS (quality of service) and accuracy, network carriers will seek a mix of positioning methods. In LTE (more than any other interface), a single positioning method will probably be insufficient. A positioning system would have to dynamically select the best single location method to use or use a hybrid technique, mixing multiple location technologies into a single or stepped solution. As networks become denser, dynamic (new nodes added/removed) and high traffic areas ("hot spot") oriented—the importance of UTDOA among a variety of methods (such as Assisted GPS) may increase. Individual positioning methods will not perform at the same rates in all environments, so they can be used to complement each other rather than as standalone methods. An LTE wireless location solution should be flexible in methods and capable of learning and adapting to the radio environment in real time. Example—selecting positioning method dynamically based on radio environment or being able to detect new network nodes and locate/position them and also classify (low power Pico or high power macro nodes (as described in U.S. patent application Ser. No. 11/948,244; "Automated Configuration of a Wireless Location System").

A. Integrated LTE Location

One example of an integrated LTE network-based wireless location solution can be found in U.S. patent application Ser. No. 12/842,86; "Network Based Location of Mobile Transmitters". This patent discusses use of LTE radio signaling to allow for network-based, uplink signal-based location using WCN provided knowledge of the dynamic resource allocation, use of Semi-Persistent Scheduling (SPS) and/or use of the Sounding Reference Signal (SRS).

B. Overlay LTE Location

The LTE network is designed as a radio access network for packet data connectivity, as the LTE network has a Flat Architecture, that is the LTE radio base station (the enhanced NodeB or just eNB) performs functions formerly accomplished in both the base transceiver station (BTS) and base station Controller (BSC). As a result, all of the system parameters and radio measurement necessary for network-based wireless location systems (WLS) are never communicated outside the eNB. One result of the LTE network configuration is that wired probe-based WLS such as described in U.S. Pat. No. 6,782,264, "Monitoring of Call Information in a Wireless Location System," are not economic.

One of the problems addressed in U.S. Pat. No. 7,783,299, Advanced Triggers for Location-based Service Applications in a Wireless Location System, concerns the difficulties with identifying a particular wireless device and discriminating its radio signals from the multitude of signals transmitted in a wireless communication system at any one time. In a WLS overlaid on a GSM wireless communications system, this is difficult not only because wireless devices are allocated communication channels at random and these channels are changed periodically, but also because the unique identifiers designating a particular wireless device are rarely, if ever, transmitted during these radio transmissions. For example, conventional methods relied upon the wireless device transmitting its mobile station identification, MSID, (TMSI or IMSI) during call set up. That is, because a wireless device transmits its MSID when it initiates a call, by monitoring the Abis link, a system with the necessary Abis monitor is able to ascertain the MSID for a wireless device initiating a call and thereby identify its channel allocation for that call in order to perform location processing. However, this approach is limited for several reasons: (1) Location determination can only be instigated when the wireless device has performed the call set up procedure which has been detected by the Abis monitor. (2) After the call has ended, the ascertained data cannot be used to identify and locate the wireless device during subsequent calls because both the channel allocation and the TMSI code will have changed. (3) The system is unable to provide any information regarding the identity of the wireless device subscriber. (4) The system can only be triggered, for example, if the wireless device calls a predefined number. That is, the system cannot be used to locate a wireless device if, for example, only the wireless device's telephone number (MSISDN) is known.

One of the inventive features described in U.S. Pat. No. 7,783,299 concerns the interaction between the data ascertained from the A-Link and GSM-MAP Link, and how this is used in location processing. Specifically, in response to the detection of a predefined network transaction, the described system correlates mobile identity data (MSID) detected on the A link with the mobile station ISDN number (MSISDN) detected on the GSM-MAP link. The inventive solution overcomes the prior art limitations enumerated above by monitoring both the GSM-MAP link and the A link and then correlating MSISDN data ascertained from the GSM-MAP link with MSID data (IMSI/TMSI) ascertained from the A link on a subscriber-by-subscriber basis. In this connection, the MSISDN, which designates the mobile user's telephone number and hence identifies the subscriber, cannot be ascertained from monitoring radio transmissions or the A link as it is never transmitted over these in unencrypted form. The illustrative system described by U.S. Pat. No. 7,783,299 ascertains this data by monitoring the GSM-MAP link. Although, the GSM-MAP link contains no radio signal information, because the system simultaneously monitors the A link, it is able to ascertain the MSID data associated with the transmitting wireless device and correlate this with the wireless device's MSISDN. Consequently, this allows the system to ascertain the complete identity information of the target wireless device. This data can then be used to subsequently locate that wireless device, even if it is idle, or already on a call. As all network transactions from that wireless device, including periodic status updates when the wireless device is idle, will involve its current TMSI being sent over the A link, the wireless device's radio transmissions can be quickly identified and then used for high accuracy location processing.

One goal of the present invention is to provide methods and systems to enable the use of network-based techniques (U-TDOA, AOA, POA, etc.) using the uplink SC-FDMA (Single-Carrier Frequency Division Multiple Access) based radio signal used in both LTE and LTE-A to achieve improved performance in locating mobile transmitters operating in an LTE or LTE-A environment. A new system combining both passive radio network monitors and passive wired monitors is employed to obtain both the triggering information and mobile identity. Obtaining uplink TDOA measurements in an LTE or LTE-A network is thus a significant challenge compared to other radio air interfaces (GSM, CDMA, CDMA-2000 or UMTS).

In LTE, the Random Access (RACH) procedure has been optimized to allow quick and reliable UE access to the network. As one of the main goals of LTE was to reduce latency in user experience (in addition to speed rates), the system is designed to allow a user to transition quickly from the IDLE to the CONNECTED state. By using an LMU with both up and downlink receivers, it is possible to determine a location in parallel to call or data session setup. This start-of-call routing enables both existing location applications as well as enhanced call routing without delay for location calculation.

FIG. 1

FIG. 1 shows an example of a $4^{th}$ generation Long Term Evolution (LTE) wireless communications network. Included in this example network is a 3GPP defined eUTRAN radio access network 123 and Evolved Packet Core (EPC) 124. Also included are the network-based Location Measurement Units (LMUs) 118 119 120 and an evolved Serving Mobile Location Center (eSMLC) 116. Please note that the distinct LMUs 118 119 120 and eSMLC 116 can be both physical and functional entities, for instance the example standalone LMU 119 unit with its own antenna and amplifier equipment, the co-located LMU 120 deployed with an eNodeB to take advantage of the attendant antenna, backhaul, and electrical and environmental facilities, and the integrated LMU 118 which is a functional entity residing in the eNodeB circuitry and software. As shown in FIG. 1, multiple types of LMU instantiations may exist in the same network. Each LMU 118 119 120 has a fast database for caching digitized radio signals. The integrated LMU 118 is provided the uplink and downlink signals via the eNodeB 106 while the co-located LMU 120 may have access to the eNodeB signals, may have links into the eNodeB antenna structures or may have distinct uplink and downlink receiver antenna (as shown). The standalone LMU 119 will require uplink and downlink receiver antenna (as shown).

In an LTE radio air access network 123, the UE 101 communicates over the LTE air interface 102 to the serving eNB 106 via the deployed antenna array 103. The LTE air interface 102 has an OFDM-based downlink and SC-FDMA-based uplink. The eUTRAN network 123 comprises antenna arrays 103 105 serving attendant eNodeBs 106 107 with associated internode communications; the X2 interface 108 and S1-U backhaul 109, and the S1-MME interface 110.

The System Architecture Evolution Gateway (SAE-GW) 111, also referred to as the Serving Gateway (S-GW), is a primarily packet routing entity for traffic data with bridging abilities to other LTE and non-LTE networks. Packet Data between the eSMLC 116 and LMUs 119 120 may be a distinct digital connection 122 121 not routed by the SAE-GW 111, but routing of digital packet data can change based on system designer preference or even on the fly given alternative routing and data load management. In practice, the SAE-GW 111 may be combined on the same platform as the Mobility Management Entity (MME) 112 for small systems, but generally the SAE-GW 111 will be a separate, scalable subsystem with a many-to-1 relationship with the MME 112.

The MME 112 is the central controller for the LTE network. The MME 112 handles inter-system functions as well as authentication control, admission control, roaming control and selection of SAE-GW 111 for the UE.

The Public Data Network Gateway (PGW) 113 is the firewall and connection point between the LTE network and external data networks. As the firewall, the PGW 113 enables operator policy enforcement, packet screening and filtering for each UE, charging support, and Lawful Intercept.

As the connection point, the PGW 113 acts as the entry and exit point for data traffic between the UE 101 and external packet data networks (not shown). The SAE-GW 111 is connected to the MME(s) 112 via the standardized S11 interface 114. The SAE-GW 111 is connected to the PGW 113 via the standardized S5 interface 115. The eSMLC 116 is connected to MME 112 via the LPPa interface 117. A connection (not shown) between the SAE-GW 111 and the eSMLC 116 has been proposed to facilitate the transfer of information from LMUs 118 119 that use not-yet standardized messaging present in the eNB 118 backhaul or not-yet standardized messaging from standalone LMUs 119 using a specialized backhaul 121 for user plane TDOA (see U.S. Pat. No. 8,150, 421, "USER PLANE UPLINK TIME DIFFERENCE OF ARRIVAL (U-TDOA)," for additional details).

In the example network, the eSMLC 116 is shown as a standalone node, while some LMUs 118 120 are integrated into or co-located with the eNodeBs and reuse antenna and backhaul communications resources. A standalone LMU 119 is also shown with dedicated backhaul 121 and dedicated antenna array(s) 104 including uplink and downlink antennae. Besides the LMU 118 119 120 and eSMLC 116 nodes, and the modified backhaul 109 110, the separate backhaul 121 122; 3GPP technical specifications can be found for all other nodes and interfaces.

On each of the S1 (eNB-MME) interfaces 110a and 110b, a passive probe 125 (125a and 125b in FIG. 1) has been installed. These S1 probes passively collect the S-TMSI (where S-TMSI stands for SAE Temporary Mobile Subscriber Identity), IMSI (International Mobile Subscriber Identity) and other identifiers (e.g. International Mobile Equipment Identity (IMEI)) which are extracted, time-stamped, and then forwarded to the eSMLC 116 over packet data connections 126a and 126b. Commercially available examples of the passive probe 125 include the JDS Uniphase Corporation's Signaling Analyzer Real Time (SART) or the Agilent Technologies' Signaling Analyzer Real Time for LTE (SART-LTE) The eSMLC 116 can then use the timestamp to match the air interface messages to the S1 messages and thus provide location to a Location Services Provider 129 over a Local or Wide Area Network (LAN/WAN) 128. The Location Services Provider 129 can be internal or external to the wireless communications operator's network. (Not shown, but applicable to large, multi-MME networks, installation of additional passive probes to monitor the S3 (MME-to-MME) interface may also be required to collect the IMSI/S-TMSI and/or IMEI/S-TMSI association.)

Figure 1A:
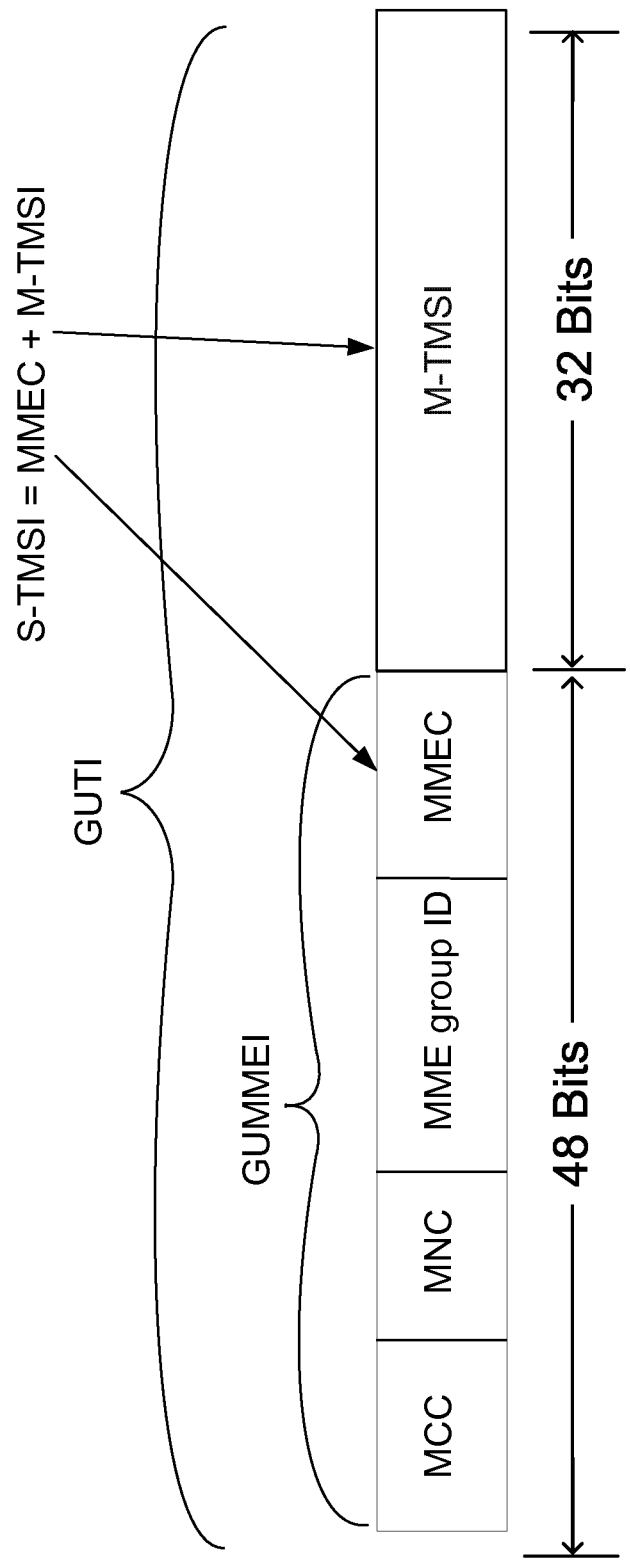
FIG. 1a depicts a temporary mobile subscriber identifier, or TMSI, employed in an LTE network.

We will now briefly describe how temporary identifiers may be employed in an LTE network (which may have GSM, UMTS and LTE subsystems or regions in the service area). In LTE, a mobile device, or UE, may be allocated multiple temporary identifiers. These so-called temporary mobile subscriber identifiers, or TMSIs, may include one for services provided through the MSC (TMSI), one for services provided through the SGSN (P-TMSI), and one for the services provided via the MME (M-TMSI). The M-TMSI may be part of a Globally Unique Temporary Identifier (GUTI), such as the GUTI illustrated in FIG. 1a. The purpose of the GUTI is to provide an unambiguous identification of the UE that does not reveal the UE or the user's permanent identity. It also provides for the identification of the MME and network, and can be used by the network and UE to establish the UE's identity during signaling between them.

As shown, the GUTI has two main components: one that uniquely identifies the MME that allocated the GUTI; and one that uniquely identifies the UE within that MME. Within the MME, the mobile device, or UE, is identified by the M-TMSI. The Globally Unique MME Identifier (GUMMEI) is constructed from the MCC, MNC and MME Identifier (MMEI). The MMEI is constructed from an MME Group ID (MMEGI) and an MME Code (MMEC). The GUTI is constructed from the GUMMEI and the M-TMSI.

For paging purposes, the UE is paged with the S-TMSI, which is constructed from the MMEC and the M-TMSI (i.e., S-TMSI=MMEC+M-TMSI). The network operator ensures that the MMEC is unique within the MME pool area and, if overlapping pool areas are in use, unique within the area of overlapping MME pools. The GUTI is used to support subscriber identity confidentiality, and, in the shortened S-TMSI form, to enable more efficient radio signaling procedures (e.g. paging and Service Request).

FIG. 2

Figure 2:
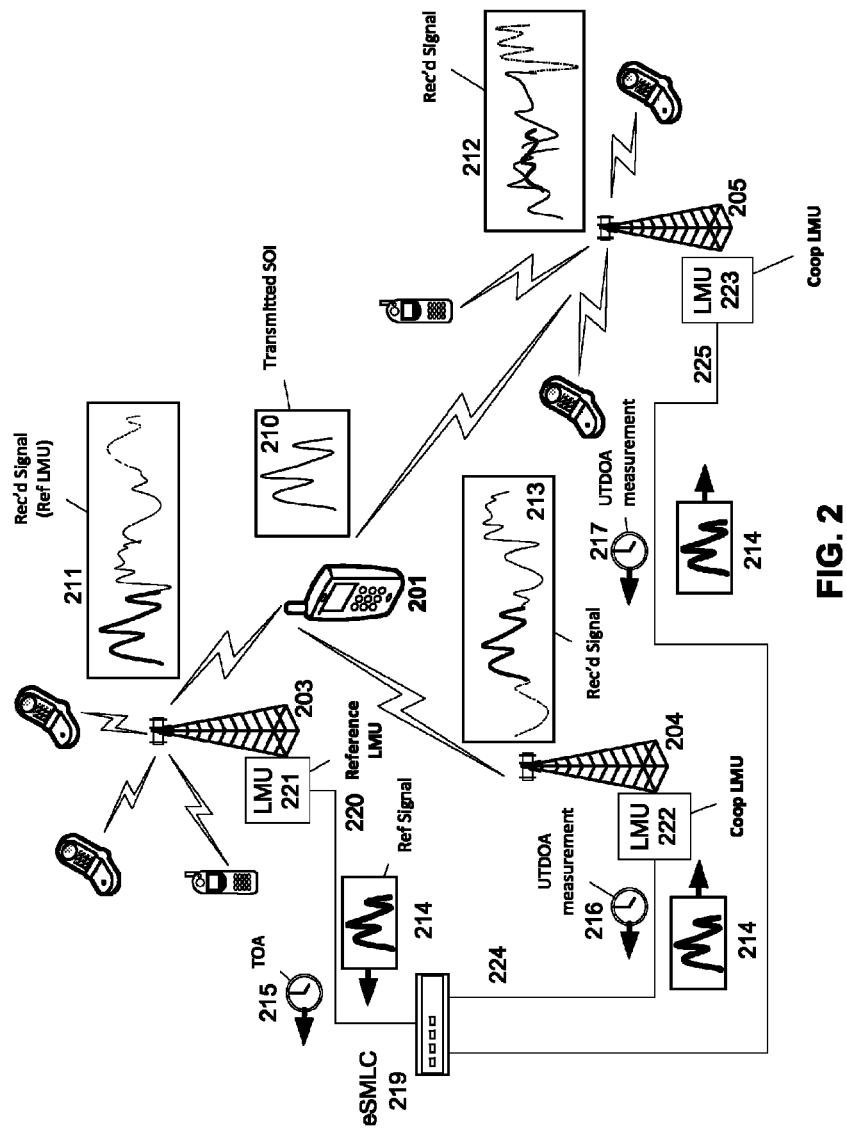
FIG. 2 shows a series of events in the determination of a UE location.

In FIG. 2, the components and operations of a network-based wireless location system (WLS) are shown. The WLS is composed of the eSMLC 219 and the geographically distributed LMUs 221 222 223. The described WLS architecture supports uplink Time-Difference-of-Arrival (U-TDOA), uplink Power-Difference-of-Arrival (PDOA) and uplink Angle-of-Arrival (AoA) location techniques. In this example WLS, the LMU's 221 222 223 are co-located with eNodeBs 203 204 205.

In an overlay wireless location system (WLS), the WLS is triggered by a triggering platform, in this case the uplink receiver and downlink receiver of the LMU 221 222 223. Using the LMU 221 222 223 collected serving cell, received power, reason code and/or mobile identity with historical, databased information, the eSMLC 219 determines the LMU best suited to detect the received signal and serve as the reference LMU. The eSMLC 219 also determines which sites are good candidates for making UTDOA and/or AoA measurements and the LMUs at these site 204 205 can act as cooperating LMUs.

In the LTE and LTE-A wireless communications network (WCN), the LMUs 221 222 223 are constantly collecting, digitizing and caching radio energy received from the known Physical Random Access Channel (PRACH) uplink channels of interest. The radio signals collected on the PRACH include the uplink Random Access Preamble (also known as "the Preamble"). The radio signals collected and demodulated on the Physical Downlink Shared Channel (PDSCH) include the Random Access Response (RAR). The radio signals collected and demodulated on the Physical Uplink Shared Channel/ Uplink shared Channel (PUSCH/UL-SCH) include the RCC Connection Request.

Once the WLS has detected a triggering event, the eSMLC 219 instructs the reference site 203 LMU (LMU 221 in FIG. 2) to forward its cached information and timestamp for the triggering event (the reference signal). To construct a reference signal, the reference LMU extracts the reference signal 214 in a radio environment with relatively small levels of interference present at the serving cell. Once the reference signal 214 is constructed, the reference LMU 221 sends the reference signal 214 and time of arrival 215 to the eSMLC 219 over the digital data backhaul 220, which then forwards the reference data 214 along to the cooperating LMUs 222 223 over the digital wired or wireless backhaul 224 225. At each LMU 203 204 205, interference and corruption of the transmitted signal of interest 210 from other UE transmissions is expected. In FIG. 2, the received signal at the reference site 203 is depicted as signal 211. As can be seen, signal 211 is superior to the signals 212 213 received at the cooperating sites 204 205 since signal 211 is less affected by interference.

Alternatively, instead of the digitized representation of the collected reference signal 214, the set of PRACH Preamble parameters can be sent by the reference LMU 221 to the eSMLC 219 and then forwarded to the cooperative LMUs. From the details of the PRACH Preamble, the cooperative LMUs can reconstruct the ideal Preamble transmitted in the signal of interest by the UE 201. The PRACH Preamble parameters in the LMU's access record include:

rootSequenceIndex—The value is used to create Zadoff-Chu sequence. There can be 64 based on shift. This is the number that allows the generation of 64 unique sequence per CELL. Each cell has a unique rootSequenceIndex.

Prach-Freqoffset—allows calculation of the exact RBs location in frequency domain for Preamble Preamble sequence ID: As detected (is 1 out of 64 possible)

Freq: UL center frequency of PRACH

LMU/GPS Timestamp: when RACH preamble was detected

PRACH format—used to determine how many sub-frames the Random Access Preamble was transmitted.

The cross-correlation with the reference signal 214 is then performed at the cooperating LMUs 222 223. At the cooperating LMUs 222 223, the locally received signal 212 213 is weak with potentially high levels of interference. The wide bandwidth of the PRACH channel and the Preamble signal give the cooperating LMUs 222 223 additional processing gain. The processing gain helps the cooperating LMUs 222 223 extract a reliable UTDOA estimate from the weak signal with relatively high levels of interference 212 213 received at the cooperating LMUs 222 223. The co-operating LMUs 222 223 send the UTDOA measurements 216 217 to the eSMLC 219 where the final mobile position is determined and sent back to the core network (not shown). Details on the matched-replica correlation process employed can be found in U.S. Pat. No. 5,327,144; "Cellular Telephone Location System" and U.S. Pat. No. 6,047,192; "Robust Efficient Localization System".

FIG. 3

Figure 3:
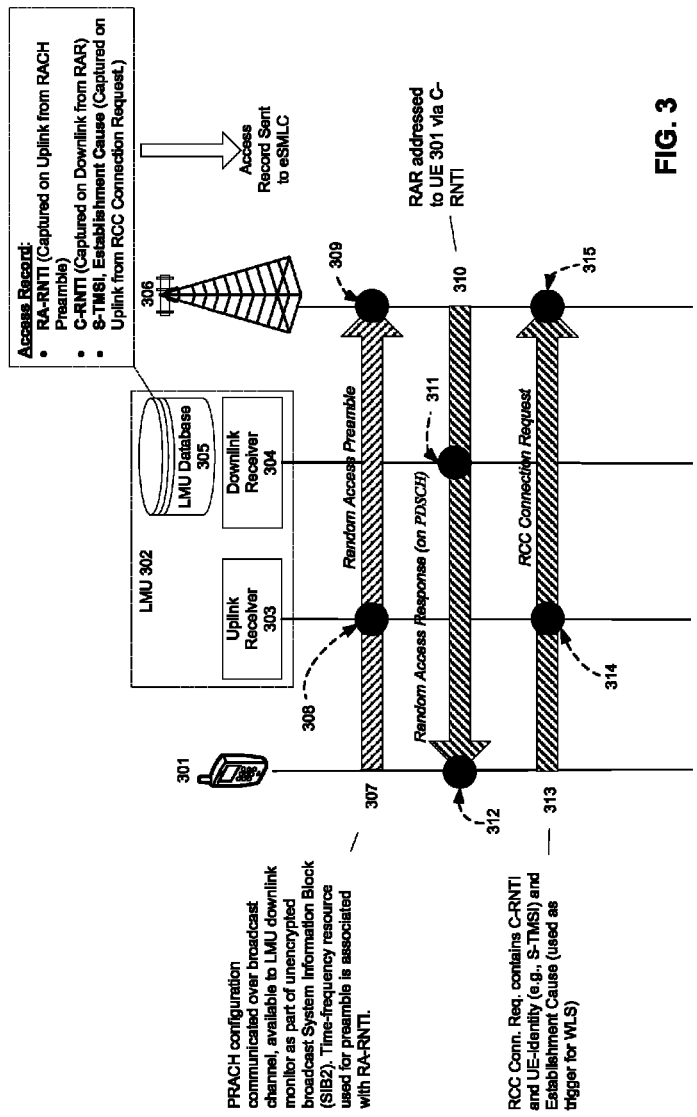
FIG. 3 shows a sequence of transmissions for accessing an LTE Radio Access Network.

FIG. 3 depicts the sequence of LTE/LTE-A radio air interface events used for an overlay network-based location. The Random Access Channel (RACH) Procedure is used to request initial uplink access, as part of call setup (Mobile-Origination and Mobile-Termination for voice, data and Short Message Service (SMS)), handover, for mobility events (e.g., cell reselection, handover, Attach, Detach) or to re-establish uplink synchronization. The Random Access Procedure is well-defined in 3GPP TS 36.300; "Evolved Universal Terrestrial Radio Access (E-UTRA) and Evolved Universal Terrestrial Radio Access Network (E-UTRAN); Overall description; Stage 2", section 10.1.5, "The Random Access" while the PRACH messages and information elements involved in the RACH procedure can be found in 3GPP technical specification 36.211, "Evolved Universal Terrestrial Radio Access (E-UTRA); Physical channels and modulation", starting in Section 5.7; "Physical random access channel" and information on the MAC Layer Procedure related to RACH Process can be found in 3GPP Technical Specification 36.213, "Evolved Universal Terrestrial Radio Access (E-UTRA); Physical layer procedures", Section 6; "Random access procedure".

The radio signaling on the RACH/PRACH has favorable characteristics for uplink wireless location. For example, the RACH messaging is typically transmitted at higher power as open loop power control is used. The signal is allocated in restricted time/frequency domain resources with minimal interference (intra-cell/sector and inter-cell) from PUSCH/PUCCH (where PUCCH is the Physical Uplink Control Channel). The same radio resources are allocated in each eNodeB, resulting in lower inter-cell interference. In LTE the physical channel used for random access is PRACH. On uplink there are three physical channels: PRACH, PUSCH and PUCCH. The PRACH channel can carry the preamble only so no logical channel is necessary on top of it.

The PRACH radio resources are typically time multiplexed between sectors of the same eNodeB (e.g., sector 1 performs PRACH detection in subframe #1, sector 2 in subframe #2 . . . ). The time multiplexing scheme results in lower complexity in the eNodeB and better signal hearability. The same advantages to the eNodeB apply to the LMU. 3GPP defines a contention based and a non-contention based random access procedure but both procedures use the same identifiers and messaging (Random Access Preamble, Response and RCC Connection Request) needed by the overlay WLS.

The LMU uses wideband receivers for signal collection, that is, to receive and digitize the incoming radio energy. 3GPP TS 36.101 "Evolved Universal Terrestrial Radio Access (E-UTRA); User Equipment (UE) radio transmission and reception", Sections 5.5-1 "E-UTRA Operating Bands" and 5.6.1-1 "E-UTRA Channel Bandwidth" describes the necessary bands and bandwidths.

The Random Access Preamble

The first step in (re)establishing radio contact between the UE 301 and the RAN, via the eNodeB 306, is to initiate a Random Access Procedure on the (uplink) Physical Random Access Channel (PRACH). As the first step in the procedure, the User Equipment (UE) 301 in response to either a UE-initiated event or in response to a Paging Request tunes its transmitter to one of the cell's Physical Random Access Channels (PRACH) and transmits a Random Access Preamble 307 to the eNodeB 306. The Random Access Preamble 307 is received 309 by the eNodeB 306 and also received 308 by the local LMU 302 via the LMU's Uplink Receiver 303. The LMU 302 detects, on UL PRACH, the Preamble_ID (and other PRACH characteristics) and caches all UE Preambles in a fast database 305. This caching is done for every UE accessing the eNB 306 using the Random Access Procedure, thus creating a database 305 of access records for each cell/sector under the eNB 306.

The LMU 302 digitizes the received Random Access Preamble 307 and saves the digitized message, the receiving antenna, and the timestamp in its fast database 305 indexed using the Preamble_ID and timestamp.

The transmission of the Random Access Preamble by the UE 301 is restricted to certain time and frequency resources. In the frequency domain, the Random Access Preamble occupies a bandwidth of six resource blocks (RBs) giving an uplink bandwidth of ~1 MHz. In the time domain, the PRACH can be over 1, 2, 3 or 4 sub-frames of 1 millisecond (depending on cell size). Different PRACH configurations are defined, which indicate system and subframe numbers with PRACH opportunities, as well as possible preamble formats. The random access preamble comprises a Zadoff Chu sequence with length TSEQ and a cyclic prefix (Tcp) and Guard time (Tgp). Per cell (or sector, if sectorized), there are 64 random access preambles. Generally it is preferred to multiplex the PRACH in time rather than frequency. In an eNodeB, a single PRACH receiver may be used for multiple cells (sectors) by assigning different time slots for each sector. Typically PRACH collision is set to 1% meaning that the LMU cache 305, which contains all Random Access Preambles data received by the LMU Uplink Receiver 303, will not be filling with badly interfered, and difficult to index, random access preambles. The PRACH configuration is provided by higher layers over the broadcast channel, available to the LMU downlink monitor as part of the unencrypted broadcast Session Information Block (SIB).

Random Access Response

The Random Access Response (RAR) message 310 is sent to the UE 301 from the eNB 306 in response to a successfully received Random Access Preamble 307 on the Physical Downlink Shared Channel (PDSCH).

The RAR message 310 at least includes a random access preamble identifier (Preamble_ID), time alignment (TALTE) information, initial uplink grant (UL grant) and a temporary cell-radio network temporary identifier (C-RNTI), and this message is indicated through a random access-radio network temporary identifier (RA-RNTI) on a physical downlink control channel (PDCCH). The C-RNTI provides a unique UE identification at the cell level identifying the RRC Connection. The C-RNTI will be used for all further bandwidth assignments during the RRC Connection. Note: Once a UE leaves the coverage area of an eNodeB, the RRC Connection must be moved (Inter-eNodeB Handover) and the "new" eNodeB will assign a new C-RNTI to the UE. The C-RNTI is a radio air interface (the LTE radio air interface is the E-UTRAN (Evolved Universal Terrestrial Radio Access Network)) specific identifier and the "core" SAE/EPC (System Architecture Evolution/Evolved Packet Core) portion of the LTE Network has no visibility to it.

The LMU downlink receiver 304 will collect 311 the entire downlink system bandwidth in a cyclic buffer and try continuously to detect RAR message assignment and for each RAR detected would try to match it (via Preamble_ID) to the earlier PRACH message and thus the LMU's access record in the database.

The downlink RAR message 310 is received 308 by the LMU 302 via its downlink receiver 304 and received 312 by the UE 301.

The LMU downlink receiver 304 detects and demodulates the RAR message 310 to extract the Preamble_ID and the Temporary C-RNTI for association back to the Access Record stored in the LMU's database 305. The C-RNTI is then added to the Access Record in the LMU's database 305.

Radio Resource Control (RCC) Connection Request Message

The UE 301 then uses the bandwidth assignment delivered in the RAR 310 to send a Radio Resource Control (RCC) Connection Request message 313 which includes the UE identity which has previously been assigned to it by the NAS (Non Access Stratum (the core wireless communication network)). The RCC Connection message 313 is used to request the establishment of an RRC connection between the UE and eNB. The RCC Connection Request message 313 is transferred over the PUSCH physical channel using Signaling Radio Bearer SRB0 on the Common Control Channel (CCCH) because neither SRB1 nor a Dedicated Control Channel (DCCH) has been setup at this point.

The LMU's wideband uplink receiver 303 is tuned to cover the entire uplink bandwidth and collects 314 the RCC Connection Request message 313. The uplink receiver 303 digitizes the received radio energy and caches the data in a cyclic buffer. Signal Processing of the stored data is used to detect the RRC Connection Request 313. Additionally, the LMU knows exactly what OFDM carriers will be used from previous RAR message 310 simplifying the signal processing.

The reception 315 of the RCC Connection Request message 313 by the eNB 306 completes the Random Access Procedure as far as the WLS is concerned.

The RCC Connection Request message 313 contains multiple information elements of interest (IEs) to the WLS. These are:

Initial UE-Identity (UE-Identity): Nominally, the UE-Identity is the S-TMSI already provided to the UE when it registered in the TA of the current (serving) cell. A 40 bit random number may be used by the UE 301 and eNB 306 if a S-TMSI is unassigned.

Establishment Cause (establishmentCause): Defined in 3GPP TS 36.331, "Evolved Universal Terrestrial Radio Access (E-UTRA); Radio Resource Control (RRC); Protocol specification", section 6.2.2. In Release 10, the Establishment Causes include:
- emergency: This cause value in Release 11.0 corresponds to NAS Procedure "MO-CS fallback Emergency call".
- highPriorityAccess: The cause initiates NAS-level congestion control for high priority access.
- mt-Access: For this cause value the corresponding NAS procedures are "Service Request" (paging response for PS domain) or "Extended Service Request" (MT-CS fallback)
- mo-Signalling: Corresponding NAS procedures are Attach, Detach, and TAU
- mo-Data: Corresponding NAS Procedures are "Service Request" and "Extended Service Request".

Each and every cause value can be used as a trigger for the WLS to attempt a location calculation using the digitized and recorded Random Access Preamble Message 307 previously transmitted on the PRACH uplink channel then digitized and recorded by the LMU network. Please note that the current (3GPP Release 11.0) set of Establishment Causes is very small and additional causes may be later added, yielding additional WLS triggering capability.

Reception 314 of the RCC Connection Request message 313 and the association of the Temporary C-RNTI to the S-TMSI allows for the final update to the LMU database's 305 access record. The access record now includes a map of preamble-ID to S-TMSI (Preamble_ID, C-RNTI, S-TMSI) and the recorded Random Access Preamble message. If the establishment cause triggers the WLS, the access record (or relevant portions thereof) will be sent to the eSMLC for use in a TDOA, AoA, PDOA, or hybrid location estimate.

Alternative Embodiments

The ability to determine location in parallel with session setup is useful for call routing and call control (for an example, see U.S. patent application Ser. No. 11/965,481, "Subscriber Selective, Area-based Service Control"). Early location allows for follow-up location, time to acquire additional location information for hybridization, or generation of assistance data for other location techniques based on a high accuracy first location. A start-of-session and mid-session location adds robustness to any location method.

Angle of Arrival

The ability of the LMU network when each LMU is equipped with a phased antenna array to perform an Angle-of-Arrival location has not been standardized by the 3GPP in Release 8, 9 or 10 although the downlink beam-forming capability of equipped eNB has been much discussed. The ability of LMUs equipped with antenna arrays that include phased array, uplink and downlink receivers to be triggered and then perform an AoA location on the cached digitized preamble radio signal, is unique.

Power of Arrival

The LMU with its uplink receiver can independently determine the received power level for a UE uplink transmission. The WLS, with its network of LMUs can be triggered and then determine a power-based or power ranging with cell-ID location estimation (using the cell antenna precise position with the power measured by the LMU and the $TA_{LTE}$ value provided in the Random Access Response to the LMU via the downlink receiver. The determination of which technique (Power-difference-of-Arrival vs. Power-ranging with uplink ECID) to use is dependent on the number of LMU's available.

Hybrid Location

Dependent on the LMU deployment and access to specialized antenna arrays, the WLS can perform multiple (U-TDOA, AoA, ECID) location methods simultaneously. The raw TDOA baselines can be fed into an A-GNSS/TDOA hybrid solution with TDOA fallback if the Location Services QoS demands highest accuracy with/without a tight time limit to first fix.

Combination of location methods yields the most robust location solution over the range of wireless communications network topology and underlying geography.

CONCLUSION

The true scope the present invention is not limited to the specific embodiments disclosed herein. For example, the foregoing disclosure of illustrative embodiments of a wireless location system and associated wireless communications system uses explanatory terms, such as LMU, eNodeB, eSMLC, LTE, SC-FDMA, and the like, that refer to structures, protocols and technical standards which represent exemplary, and in some cases presently preferred, implementations of the inventive concepts described herein, but these are by no means intended to limit the invention. Accordingly, except as they may be expressly so limited, the scope of protection of the following claims is not intended to be limited to the specific embodiments described above.

We claim:

1. A method for locating a first wireless device operating in an LTE wireless communications system, wherein, to initially request access to the LTE wireless communications system, the first wireless device is configured to employ a Random Access Channel (RACH) and a process in which the first wireless device transmits a RACH preamble signal representing one of a predetermined total number of RACH preambles available in the LTE wireless communications system, wherein the predetermined total number of RACH preambles are shared among a plurality of mobile devices for initial access, the method comprising:

employing a plurality of location measuring units (LMU) to monitor an LTE uplink channel for uplink RACH transmissions, wherein each of the plurality of LMUs is configured to operate as a reference LMU or a cooperative LMU;

upon detection, by at least one of said LMUs, of a RACH preamble matching one of the predetermined total number of RACH preambles available in the LTE wireless communications system, recording a preamble identifier (RA-RNTI) associated with the RACH preamble in a database and employing a reference LMU to monitor a downlink channel of the LTE communications system for a RACH Response signal (RAR) addressed to the first wireless device via a first temporary identifier (C-RNTI) for the first wireless device;

employing the reference LMU to detect a connection request message (RCC Connection Request) transmitted by the first wireless device, the connection request message including a second temporary identifier (S-TMSI) and a reason code (Establishment Cause), wherein the second temporary identifier is an SAE Temporary Mobile Subscriber Identity (S-TMSI) previously assigned to the first wireless device;

associating the first temporary identifier (C-RNTI), second temporary identifier (S-TMSI), and reason code (Establishment Cause) in the database such that the database provides an access record including the preamble identifier (RA-RNTI), first and second temporary identifiers (C-RNTI, S-TMSI), and reason code (Establishment Cause); and determining whether the reason code matches a first predefined trigger, and if so locating the first wireless device.

2. The method recited in claim 1, further comprising determining whether a second predefined trigger matches at least one member of the group consisting of: International Mobile Subscriber Identity (IMSI) of subscriber, International Mobile Equipment Identity (IMEI) of first wireless device, Cell-ID, time of day; and if so locating the first wireless device.

3. The method recited in claim 1, wherein the plurality of mobile devices are informed about the process for generating RACH preambles via parameters broadcast by a base station in a System Information Block (SIB2) communication on a downlink channel.

4. The method recited in claim 1, wherein the LTE uplink channel to monitor is determined by receiving information broadcast by a base station on a downlink channel.

5. The method recited in claim 1, wherein the downlink channel monitored by the reference LMU for a RAR is a Physical Downlink Shared Channel (PDSCH).

6. The method recited in claim 1, wherein the first temporary identifier included in the RAR is a Cell Radio Network Temporary Identifier (C-RNTI).

7. The method recited in claim 1, wherein the cooperative LMUs are operative to buffer received data while the reference LMU determines the reason for the connection request.

8. The method recited in claim 1, further comprising performing the following actions to locate the first wireless device:

communicating the detected preamble from the reference LMU to a plurality of cooperative LMUs;

employing a plurality of cooperative LMUs to correlate the detected preamble, or a signal generated at the cooperative LMU based on the detected preamble, with collected data buffered at the at least one cooperative LMU, and determining a time of arrival (TOA) of the RACH transmission at each of the plurality of cooperative LMUs; and determining the location of the first wireless device based on the times of arrival of the RACH transmission at the reference LMU and the plurality of cooperative LMUs.

9. The method recited in claim 1, wherein the connection request message comprises an RCC Connection Request message containing an initial UE-Identity field comprising at least one of an S-TMSI previously provided to the first wireless device upon registration with a current serving cell of the LTE communications system, and a random number used by the first wireless device and current serving cell if an S-TMSI is unassigned.

10. The method recited in claim 9, wherein the RCC Connection Request message further contains an Establishment Cause field that is configurable to indicate a cause value corresponding to at least one of an emergency call, a high priority access request, a service request, and an extended service request; and further comprising using the cause value as a trigger for attempting a location calculation.

11. The method recited in claim 1, further comprising: using an S1 probe to passively monitor an S1 link of the LTE wireless communications system and provide the S-TMSI assigned to the first wireless device to an evolved Serving Mobile Location Center (eSMLC); and matching the S-TMSI provided to the eSMLC with the S-TMSI contained in the access record.

12. The method recited in claim 1, further comprising: using an S1 probe to passively monitor an S1 link of the LTE wireless communications system and provide the S-TMSI and International Mobile Subscriber Identity (IMSI) assigned to the first wireless device to an evolved Serving Mobile Location Center (eSMLC); and matching the S-TMSI provided to the eSMLC with the S-TMSI contained in the access record.

13. The method recited in claim 1, further comprising: using an S1 probe to passively monitor an S1 link of the LTE wireless communications system and provide the S-TMSI and International Mobile Equipment Identity (IMEI) assigned to the first wireless device to an evolved Serving Mobile Location Center (eSMLC); and matching the S-TMSI provided to the eSMLC with the S-TMSI contained in the access record.

14. The method recited in claim 1, further comprising: using an S1 probe to passively monitor an S1 link of the LTE wireless communications system and provide the S-TMSI, International Mobile Subscriber Identity (IMSI), and International Mobile Equipment Identity (IMEI) assigned to the first wireless device to an evolved Serving Mobile Location Center (eSMLC); and matching the S-TMSI provided to the eSMLC with the S-TMSI contained in the access record.

15. A system for locating a wireless device operating in an LTE wireless communications system, comprising a plurality of location measuring units (LMU), wherein at least one LMU is configured to:
monitor an LTE uplink channel for an uplink Random Access Channel (RACH) transmission;
upon detection of a RACH preamble matching a predetermined RACH preamble, record a preamble identifier associated with the RACH preamble in a database;
monitor a downlink channel of the LTE communications system for a RACH Response signal (RAR) addressed to the first wireless device via a first temporary identifier assigned to the first wireless device;
detect a connection request message transmitted by the first wireless device, the connection request message including a second temporary identifier and a reason code, wherein the second temporary identifier is a SAE Temporary Mobile Subscriber Identity (S-TMSI) previously assigned to the first wireless device; and
associate the first temporary identifier, the second temporary identifier, and the reason code in the database such that the database provides an access record including the preamble identifier, the first and second temporary identifiers, and the reason code; and determine whether the reason code matches a first predefined trigger for locating the first wireless device.

16. The system recited in claim 15, further comprising means for determining whether the reason code matches a first predefined trigger.

17. The system recited in claim 15, further comprising means for determining whether a second predefined trigger matches at least one member of the group consisting of: International Mobile Subscriber Identity (IMSI) of subscriber, International Mobile Equipment Identity (IMEI) of first wireless device, Cell-ID, time of day.

18. The system recited in claim 15, further comprising means for locating the first wireless device in response to determining that (a) the reason code matches a first predefined trigger, or (b) a second predefined trigger matches at least one member of the group consisting of: International Mobile Subscriber Identity (IMSI) of subscriber, International Mobile Equipment Identity (IMEI) of first wireless device, Cell-ID, time of day.

19. The system recited in claim 15, further comprising an evolved Serving Mobile Location Center (eSMLC) and means for communicating the access record from the database to the eSMLC.

20. The system recited in claim 19, further comprising an S1 probe configured to passively monitor an S1 link of the LTE wireless communications system and provide an SAE Temporary Mobile Subscriber Identity (S-TMSI) assigned to the first wireless device to the eSMLC.

21. The system recited in claim 20, further comprising means for matching the S-TMSI provided to the eSMLC with the S-TMSI contained in the access record.

22. The system recited in claim 20, wherein the S1 probe is further configured to monitor the S1 link and provide at least one of an International Mobile Subscriber Identity (IMSI) and International Mobile Equipment Identity (IMEI) assigned to the first wireless device to the eSMLC.

23. The system recited in claim 15, wherein the preamble identifier is a random access-radio network temporary identifier (RA-RNTI), and the first temporary identifier is a cell-radio network temporary identifier (C-RNTI).

24. The system recited in claim 15, wherein the connection request message is a Radio Resource Control Connection Request (RCC Connection Request), and the reason code is an Establishment Cause message.

25. The system recited in claim 15, wherein the downlink channel monitored for a RAR is a Physical Downlink Shared Channel (PDSCH).

26. The system recited in claim 15, wherein the connection request message comprises an RCC Connection Request message containing an initial UE-Identity field comprising at least one of an SAE Temporary Mobile Subscriber Identity (S-TMSI) previously provided to the first wireless device upon registration with a current serving cell of the LTE communications system, and a random number used by the first wireless device and current serving cell if an S-TMSI is unassigned.

27. A non-transitory computer readable medium comprising instructions for execution by a wireless location system (WLS) in carrying out a method for locating a first wireless device operating in an LTE wireless communications system, wherein, to initially request access to the LTE wireless communications system, the first wireless device is configured to employ a Random Access Channel (RACH) and a process in which the first wireless device transmits a RACH preamble signal representing one of a predetermined total number of RACH preambles available in the LTE wireless communications system, including:

instructions for employing a plurality of location measuring units (LMU) to monitor an LTE uplink channel for uplink RACH transmissions, wherein each of the plurality of LMUs is configured to operate as a reference LMU or a cooperative LMU;

instructions for recording a preamble identifier (RA-RNTI) associated with a detected RACH preamble in a database and employing a reference LMU to monitor a downlink channel of the LTE communications system for a RACH Response signal (RAR) addressed to the first wireless device via a first temporary identifier (C-RNTI) for the first wireless device;

instructions for employing the reference LMU to detect a connection request message (RCC Connection Request) transmitted by the first wireless device, the connection request message including a second temporary identifier (S-TMSI) and a reason code (Establishment Cause), wherein the second temporary identifier is a SAE Temporary Mobile Subscriber Identity (S-TMSI) previously assigned to the first wireless device;

instructions for associating the first temporary identifier (C-RNTI), second temporary identifier (S-TMSI), and reason code (Establishment Cause) in the database such that the database provides an access record including the preamble identifier (RA-RNTI), first and second temporary identifiers (C-RNTI, S-TMSI), and reason code (Establishment Cause); and instructions for determining whether the reason code matches a first predefined trigger.

\* \* \* \* \*